(12) United States Patent
Ozeki

(10) Patent No.: US 11,105,430 B2
(45) Date of Patent: Aug. 31, 2021

(54) CONTROL VALVE

(71) Applicant: YAMADA MANUFACTURING CO., LTD., Kiryu (JP)

(72) Inventor: Akifumi Ozeki, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 111 days.

(21) Appl. No.: 16/547,138

(22) Filed: Aug. 21, 2019

(65) Prior Publication Data

US 2020/0088308 A1 Mar. 19, 2020

(30) Foreign Application Priority Data

Sep. 13, 2018 (JP) .............................. JP2018-171893

(51) Int. Cl.
| | |
|---|---|
| *F16K 11/08* | (2006.01) |
| *F16K 5/18* | (2006.01) |
| *F01P 7/14* | (2006.01) |
| *F16K 25/00* | (2006.01) |
| *F16K 11/02* | (2006.01) |
| *F16K 5/04* | (2006.01) |
| *F16K 31/00* | (2006.01) |
| *B60H 1/00* | (2006.01) |

(52) U.S. Cl.
CPC .............. *F16K 11/022* (2013.01); *F01P 7/14* (2013.01); *F16K 5/0428* (2013.01); *B60H 1/00885* (2013.01); *F01P 2007/146* (2013.01); *F16K 31/005* (2013.01); *Y10T 137/86533* (2015.04)

(58) Field of Classification Search
CPC . Y10T 137/86533; F16K 25/00; F16K 5/181; F16K 11/0856; F01P 2007/146
See application file for complete search history.

(56) References Cited

U.S. PATENT DOCUMENTS

| | | | | |
|---|---|---|---|---|
| 2,698,731 | A * | 1/1955 | Koehler | ................ F16K 5/0657 251/172 |
| 3,382,892 | A * | 5/1968 | Cerbin | .................. F16L 37/107 137/614.02 |
| 4,593,918 | A * | 6/1986 | Geissler | .................... F01L 7/10 123/188.6 |

(Continued)

FOREIGN PATENT DOCUMENTS

JP 2017-003064 1/2017

*Primary Examiner* — Seth W. Mackay-Smith
(74) *Attorney, Agent, or Firm* — Rankin, Hill & Clark LLP

(57) ABSTRACT

A control valve includes a casing, a valve body, and a seal cylindrical member. The casing includes an inlet and an outlet. The valve body is rotatably disposed inside the casing and includes a circumferential wall portion in which a valve hole that allows the inside and outside to communicate is formed. The seal cylindrical member includes one end portion which communicates with a downstream side of an outlet and the other end portion on which a valve sliding contact surface is provided. In the other end portion of the seal cylindrical member, a protrusion height changes continuously in a circumferential direction along a shape of an outer circumferential surface of the circumferential wall portion. A thick portion which is thicker compared to other portions is provided in a region of the other end portion of the seal cylindrical member at which the protrusion height is high.

3 Claims, 11 Drawing Sheets

(56) References Cited

U.S. PATENT DOCUMENTS

| | | | | |
|---|---|---|---|---|
| 4,778,148 | A * | 10/1988 | Kruger | F01L 7/16 |
| | | | | 123/190.17 |
| 4,911,408 | A * | 3/1990 | Kemp | F16K 5/0673 |
| | | | | 251/174 |
| 8,820,706 | B2 * | 9/2014 | Kawauchi | F16K 5/205 |
| | | | | 251/180 |
| 9,803,764 | B2 * | 10/2017 | Chang | F16K 17/386 |
| 9,897,217 | B2 * | 2/2018 | Greene | F16K 11/085 |
| 2003/0178595 | A1 * | 9/2003 | Koester | F16K 5/204 |
| | | | | 251/174 |
| 2016/0273671 | A1 * | 9/2016 | Chang | F16K 11/0856 |
| 2017/0009894 | A1 * | 1/2017 | Seko | F16K 31/041 |
| 2017/0211460 | A1 * | 7/2017 | Suzuki | F01P 7/14 |
| 2017/0335750 | A1 * | 11/2017 | Yumisashi | F16K 5/06 |
| 2017/0363221 | A1 * | 12/2017 | Yang | F16K 5/12 |
| 2018/0066758 | A1 * | 3/2018 | Yumisashi | F16K 27/067 |

* cited by examiner

CONTROL VALVE

CROSS-REFERENCE TO RELATED APPLICATION

Priority is claimed on Japanese Patent Application No. 2018-171893, filed Sep. 13, 2018, the content of which is incorporated herein by reference.

BACKGROUND OF THE INVENTION

Field of the Invention

The present invention relates to a control valve used for switching a flow path of cooling water for vehicles.

Description of Related Art

In cooling systems that cool engines using cooling water, there are cases in which a bypass flow path that bypasses a radiator, a warmer fluid flow path through which an oil warmer passes, and the like are provided in combination in addition to a radiator flow path for circulation between the radiator and the engine. In this type of cooling system, a control valve is interposed at a branch portion of flow paths, and the flow paths are switched by the control valve as appropriate. As a control valve, one in which a valve body having a cylindrical shape is rotatably disposed inside a casing and an arbitrary flow path is opened or closed according to a rotational position of the valve body is known (see, for example, Japanese Unexamined Patent Application, First Publication No. 2017-3064 (hereinafter referred to as Patent Document 1)).

In the control valve described in Patent Document 1, an inlet into which a liquid such as cooling water flows and a plurality of outlets through which the liquid that has flowed in is caused to flow out to the outside are provided in a casing. In a circumferential wall of the valve body, a plurality of valve holes that allow the inside and outside to communicate are formed corresponding to the plurality of outlets. One end portion side of a seal cylindrical member having substantially a cylindrical shape is slidably held at each of the outlets. One end portion of each seal cylindrical member communicates with a downstream side of the corresponding outlet. Also, a valve sliding contact surface that is slidably in contact with an outer circumferential surface of the valve body is provided at the other end of each seal cylindrical member. The valve sliding contact surface of each seal cylindrical member is in sliding contact with the outer circumferential surface of the valve body at a position in which a rotation path of the corresponding valve hole of the valve body is overlapped.

Further, the valve sliding contact surface of the seal cylindrical member is formed to follow an outer surface shape of the valve body in order to be in close contact with the outer circumferential surface of the valve body. That is, in the other end portion in an axial direction of the seal cylindrical member, a protrusion height in a direction of the valve body continuously changes in the circumferential direction of the seal cylindrical member to follow an outer surface shape of the valve body.

The valve body of the above-described control valve allows an outflow of a liquid from an inner region of the valve body to a corresponding outlet when the seal cylindrical member is at a rotational position at which it communicates with a corresponding valve hole and shuts off an outflow of the liquid from the inner region of the valve body to the corresponding outlet when the seal cylindrical member is at a rotational position at which it does not communicate with the corresponding valve hole. Further, the rotational position of the valve body is operated using actuators such as an electric motor.

SUMMARY OF THE INVENTION

However, since the protrusion height of the other end portion of the seal cylindrical member continuously changes to follow an outer surface shape of the valve body in the above-described conventional control valve, bending deformation is likely to occur in a region at which the protrusion height of the other end portion of the seal cylindrical member is high when a fluid pressure inside the casing is received from the outside in the radial direction. Therefore, variation may occur in a degree of ease with which the seal cylindrical member is bent in the circumferential direction due to change in the protrusion height at an end portion in the axial direction of the seal cylindrical member, and as a result, there is a concern that a gap may be formed between the seal cylindrical member and the valve body.

An aspect according to the present invention has been made in consideration of such circumstances, and an objective of the present invention is to provide a control valve capable of alleviating variation in bending in the circumferential direction of the seal cylindrical member due to change in the protrusion height of the end portion in the axial direction of the seal cylindrical member and enhancing sealing between the seal cylindrical member and the valve body.

In order to solve the above problems, the present invention employs the following configuration.

(1) A control valve according to an aspect of the present invention includes a casing including an inlet into which a liquid flows from the outside and an outlet through which the liquid that has flowed into the inside is caused to flow out to the outside, a valve body rotatably disposed inside the casing and including a circumferential wall portion in which a valve hole that allows the inside and outside to communicate is formed, and a seal cylindrical member including one end portion in an axial direction which communicates with a downstream side of the outlet and the other end portion in the axial direction in which a valve sliding contact surface which is slidably in contact with an outer circumferential surface of the circumferential wall portion is provided at a position in which at least a portion in a rotation path of the valve hole of the valve body is overlapped, in which the other end portion in the axial direction of the seal cylindrical member includes a thick portion which is thicker compared to other portions in a region of the other end portion in the axial direction of the seal cylindrical member in which a protrusion height is high in the control valve in which the protrusion height in a direction toward the circumferential wall portion continuously changes in a circumferential direction along a shape of the outer circumferential surface of the circumferential wall portion.

According to the above-described aspect (1), when the other end portion in the axial direction of the seal cylindrical member is closed by the outer circumferential surface of the circumferential wall portion of the valve body, an outflow of the liquid from the inside of the valve body to the outlet is shut off. When the valve body rotates in the state described above and the other end portion in the axial direction of the seal cylindrical member communicates with (overlaps) the valve hole of the valve body, the liquid flows out from the inside of the valve body to the outlet. When the other end portion in the axial direction of the seal cylindrical member is closed by the outer circumferential surface of the circumferential wall portion of the valve body, a pressure of the liquid inside the casing acts on the outer circumferential surface of the other end portion in the axial direction of the seal cylindrical member. Although the other end portion in the axial direction of the seal cylindrical member has a protrusion height that changes continuously in the circumferential direction, a region in which the protrusion height is high and which is likely to cause bending deformation is reinforced by the thick portion. Therefore, in the other end portion in the axial direction of the seal cylindrical member, variation in bending in the circumferential direction when a pressure of the liquid inside the casing is received is alleviated. As a result, formation of a gap between the valve sliding contact surface and the circumferential wall portion of the valve body is inhibited.

(2) In the above-described aspect (1), the thick portion may be provided to bulge radially inward of a circumferential wall of the seal cylindrical member.

In the case of the above-described aspect (2), a pressure of the liquid inside the casing that acts from the radial outer side of the seal cylindrical member can be efficiently received by the radial inner side of the seal cylindrical member. Therefore, when the above-described aspect (2) is employed, variation in the bending in the circumferential direction of the seal cylindrical member can be more stably alleviated.

(3) In the above-described aspect (1) or (2), the thick portion may be provided in a region which does not reach an end surface of the other end portion in the axial direction of the seal cylindrical member, and the valve sliding contact surface may be formed to have a substantially constant radial width throughout in the circumferential direction of the seal cylindrical member.

In the case of the above-described aspect (3), variation in surface pressure in the circumferential direction of the valve sliding contact surface can also be alleviated while variation in bending in the circumferential direction of the seal cylindrical member can be alleviated by the thick portion. Therefore, when this configuration is employed, sealing between the valve sliding contact surface of the seal cylindrical member and the circumferential wall portion of the valve body can be further enhanced.

(4) In the above-described aspect (1) or (2), the thick portion may extend to an end surface of the other end portion of the seal cylindrical member to constitute a portion of the valve sliding contact surface, and a linear inner edge portion extending parallel to a rotation axis of the valve body may be formed by the thick portion at two positions on the valve sliding contact surface facing each other in the circumferential direction of the seal cylindrical member.

In the case of the above-described aspect (4), since a pair of linear inner edge portions parallel to the rotation axis of the valve body are provided on the valve sliding contact surface by the thick portions, when the other end portion of the seal cylindrical member communicates with the valve hole of the valve body according to rotation of the valve body, it communicates initially with the valve hole at one of the linear inner edge portions. Also, when the other end portion of the seal cylindrical member is no longer able to communicate with the valve hole of the valve body due to rotation in the same direction of the valve body, it finally communicates with the valve hole at the other of the linear inner edge portions. In the above-described aspect (4), since the linear inner edge portions parallel to the rotation axis of the valve body are provided on the valve sliding contact surface, a fixed communication start position and communication end position of the valve hole can be maintained due to the linear inner edge portions. Therefore, when the above-described aspect (4) is employed, outflow characteristics of a liquid can be made stable.

(5) In any one of the above-described aspects (1) to (4), the seal cylindrical member may include a first cylindrical portion positioned on one end side in the axial direction and configured to communicate with the outlet, and a second cylindrical portion positioned on the other end side in the axial direction and having the valve sliding contact surface formed at an end portion in the axial direction, an inner diameter of the first cylindrical portion may be formed to be smaller than an inner diameter of the second cylindrical portion, and the thick portion may be provided on a radial inner side of the second cylindrical portion.

In the case of the above-described aspect (5), a flow rate of a liquid flowing out to a downstream side of the outlet through the seal cylindrical member is determined by the inner diameter of the first cylindrical portion of the seal cylindrical member having a relatively small inner diameter. Since the thick portion is provided on the radial inner side of the second cylindrical portion having a relatively large inner diameter, the thick portion does not affect the flow rate of the liquid flowing out to the downstream side of the outlet. Therefore, when the above-described aspect (5) is employed, a flow rate of a liquid flowing out to the outlet can be easily set and regulated.

In the aspect according to the present invention, the thick portion which is thicker compared to other portions is provided in a region in which the protrusion height is high on the circumferential wall of the other end portion in the axial direction of the seal cylindrical member, and thereby a region which is likely to cause bending deformation is reinforced by the thick portion. Therefore, according to the aspect of the present invention, variation in bending in the circumferential direction of the seal cylindrical member due to change in the protrusion height of the end portion in the axial direction of the seal cylindrical member can be alleviated. Therefore, when the aspect according to the present invention is employed, sealing between the seal cylindrical member and the valve body can be enhanced.

DETAILED DESCRIPTION OF THE INVENTION

Next, an embodiment of the present invention will be described on the basis of the drawings. In the following description, a case in which a control valve of the present embodiment is employed in a cooling system for cooling an engine using cooling water will be described. In each embodiment, the same parts are denoted by the same references and duplicated descriptions thereof will be omitted.

[Cooling System]

Figure 1:
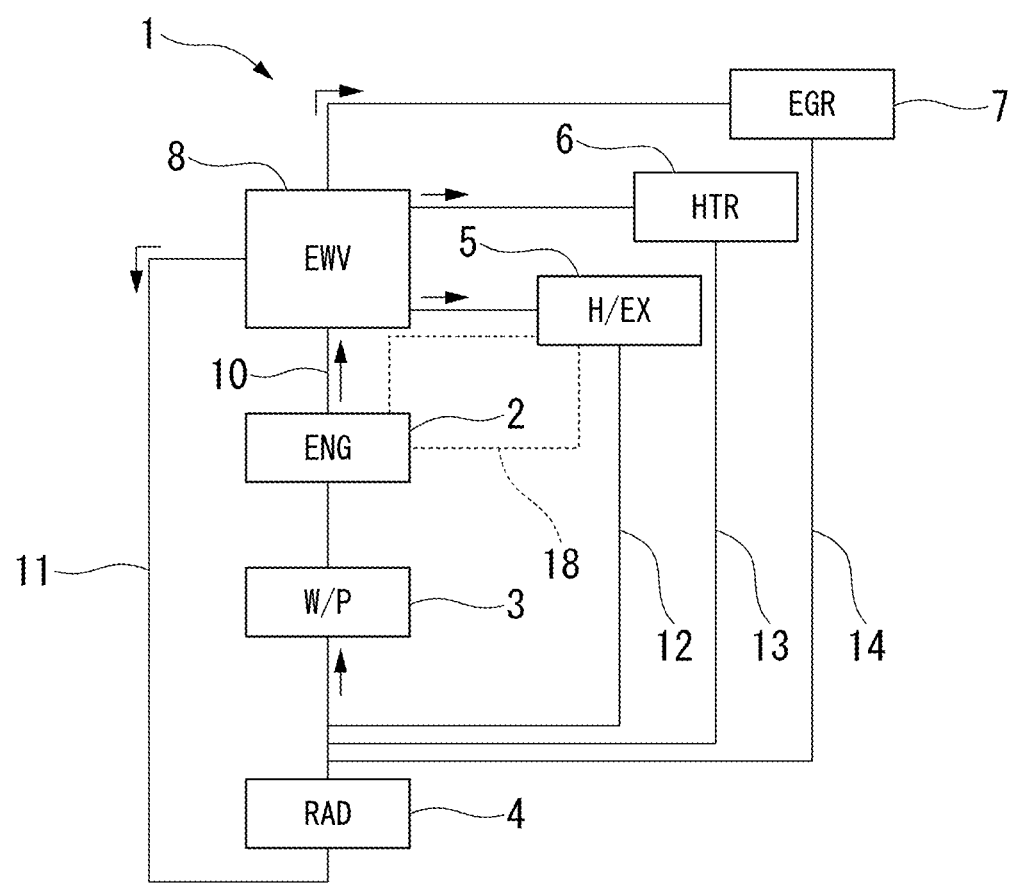
FIG. 1 is a block diagram of a cooling system according to an embodiment.

FIG. 1 is a block diagram of a cooling system 1.

As illustrated in FIG. 1, the cooling system 1 is mounted on a vehicle in which at least an engine is included as a vehicle drive source. As a vehicle, a hybrid vehicle, a plug-in hybrid vehicle, or the like may be included in addition to a vehicle having only an engine.

The cooling system 1 is configured such that an engine 2 (ENG), a water pump 3 (W/P), a radiator 4 (RAD), a heat exchanger 5 (H/EX), a heater core 6 (HTR), an EGR cooler 7 (EGR), and a control valve 8 (EWV) are connected by various flow paths 10 to 14.

The water pump 3, the engine 2, and the control valve 8 are connected in order from an upstream to a downstream on a main flow path 10. In the main flow path 10, cooling water (liquid) passes through the engine 2 and the control valve 8 in order due to an operation of the water pump 3.

A radiator flow path 11, a warm-up flow path 12, an air conditioning flow path 13, and an EGR flow path 14 are each connected to the main flow path 10. The radiator flow path 11, the warm-up flow path 12, the air conditioning flow path 13, and the EGR flow path 14 connect an upstream portion of the water pump 3 in the main flow path 10 and the control valve 8.

The radiator 4 is connected to the radiator flow path 11. In the radiator flow path 11, heat exchange between cooling water and outside air is performed in the radiator 4.

A heat exchanger 5 is connected to the warm-up flow path 12. An engine oil is circulated between the heat exchanger 5 and the engine 2 through an oil flow path 18. In the warm-up flow path 12, heat exchange between cooling water and engine oil is performed in the heat exchanger 5. That is, the heat exchanger 5 functions as an oil warmer when a water temperature is higher than an oil temperature and heats the engine oil. On the other hand, the heat exchanger 5 functions as an oil cooler when a water temperature is lower than an oil temperature and cools the engine oil.

The heater core 6 is connected to the air conditioning flow path 13. The heater core 6 may be provided, for example, in a duct (not illustrated) of an air conditioner. In the air conditioning flow path 13, heat exchange between cooling water and air conditioning air flowing in the duct is performed in the heater core 6.

The EGR cooler 7 is connected to the EGR flow path 14. In the EGR flow path 14, heat exchange between cooling water and an EGR gas is performed in the EGR cooler 7.

In the cooling system 1 described above, cooling water which has passed through the engine 2 in the main flow path 10 flows into the control valve 8 and then is selectively distributed to the various flow paths 11 to 13 by an operation of the control valve 8. Thereby, a fast rise in temperature and control of a high-water temperature (optimum temperature) can be realized, and thus improvement in fuel efficiency of the vehicle can be achieved.

<Control Valve>

Figure 2:
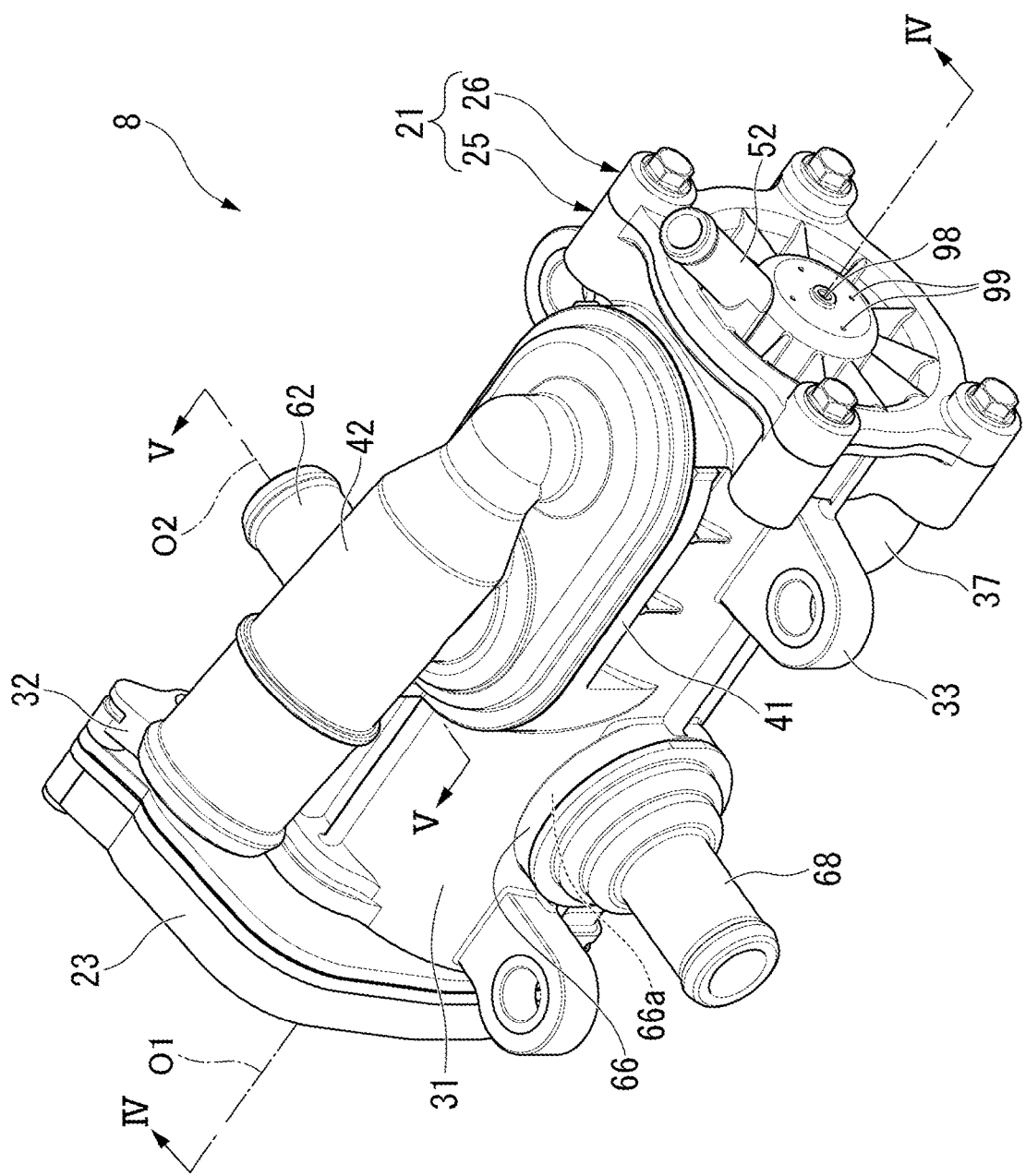
FIG. 2 is a perspective view of a control valve according to the embodiment.
Figure 3:
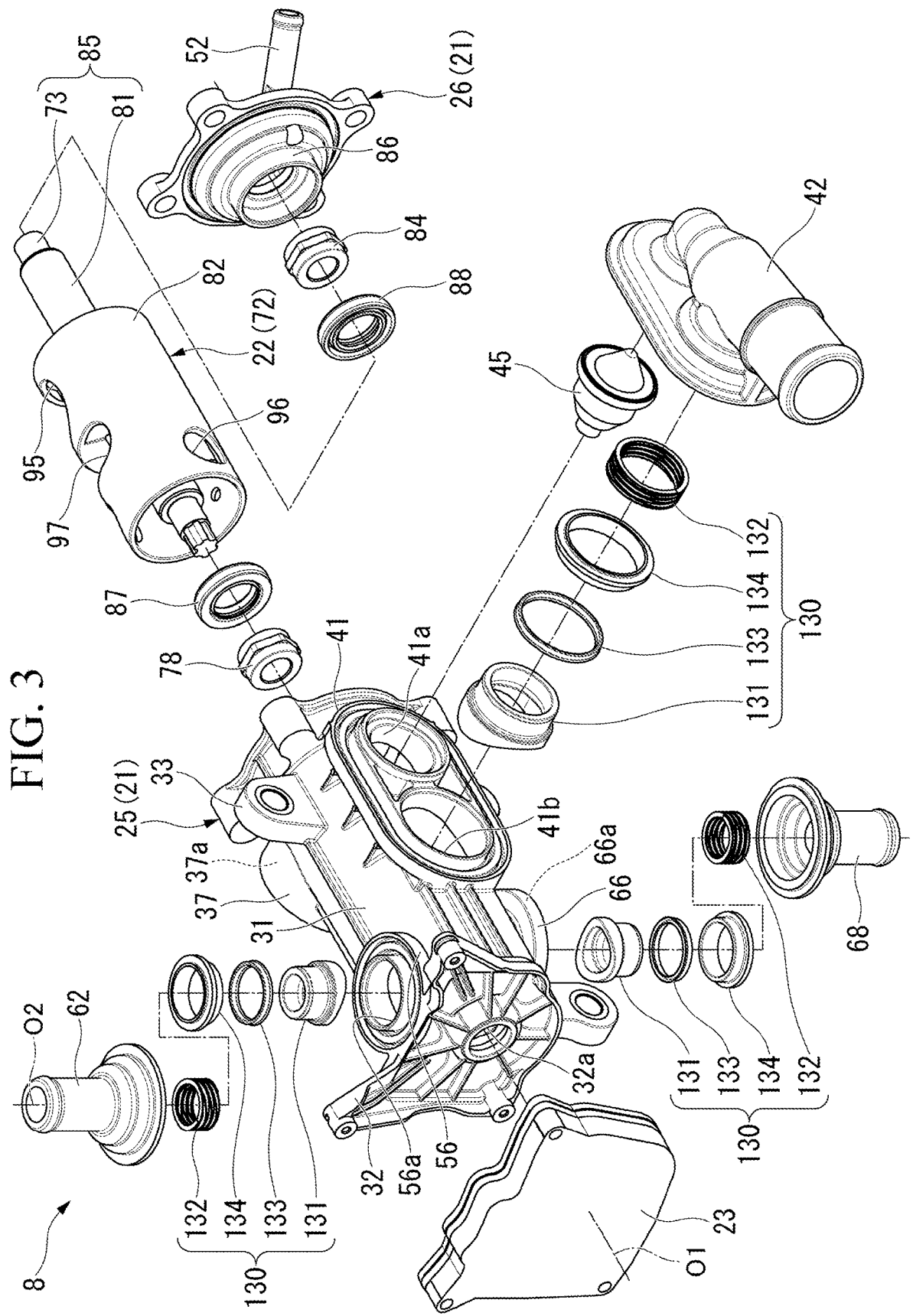
FIG. 3 is an exploded perspective view of the control valve according to the embodiment.

FIG. 2 is a perspective view of the control valve 8. FIG. 3 is an exploded perspective view of the control valve 8.

As illustrated in FIGS. 2 and 3, the control valve 8 mainly includes a casing 21, a valve body 22 (see FIG. 3), and a drive unit 23.

(Casing)

The casing 21 includes a bottomed cylindrical casing main body 25 and a lid body 26 which closes an opening of the casing main body 25. In the following description, a direction along an axis O1 of the casing 21 is simply referred to as a case axial direction. In the case axial direction, a direction toward a bottom wall portion 32 of the casing main body 25 with respect to a case circumferential wall 31 of the casing main body 25 is referred to as a first side, and a direction toward the lid body 26 with respect to the case circumferential wall 31 of the casing main body 25 is referred to as a second side. Further, a direction perpendicular to the axis O1 is referred to as a case radial direction, and a direction around the axis O1 is referred to as a case circumferential direction.

A plurality of mounting pieces 33 are formed on the case circumferential wall 31 of the casing main body 25. Each of the mounting pieces 33 protrudes outward in the case radial direction from the case circumferential wall 31. The control valve 8 is fixed in an engine compartment via, for example, respective mounting pieces 33. Further, positions, numbers, or the like of the respective mounting pieces 33 can be changed as appropriate.

Figure 4:
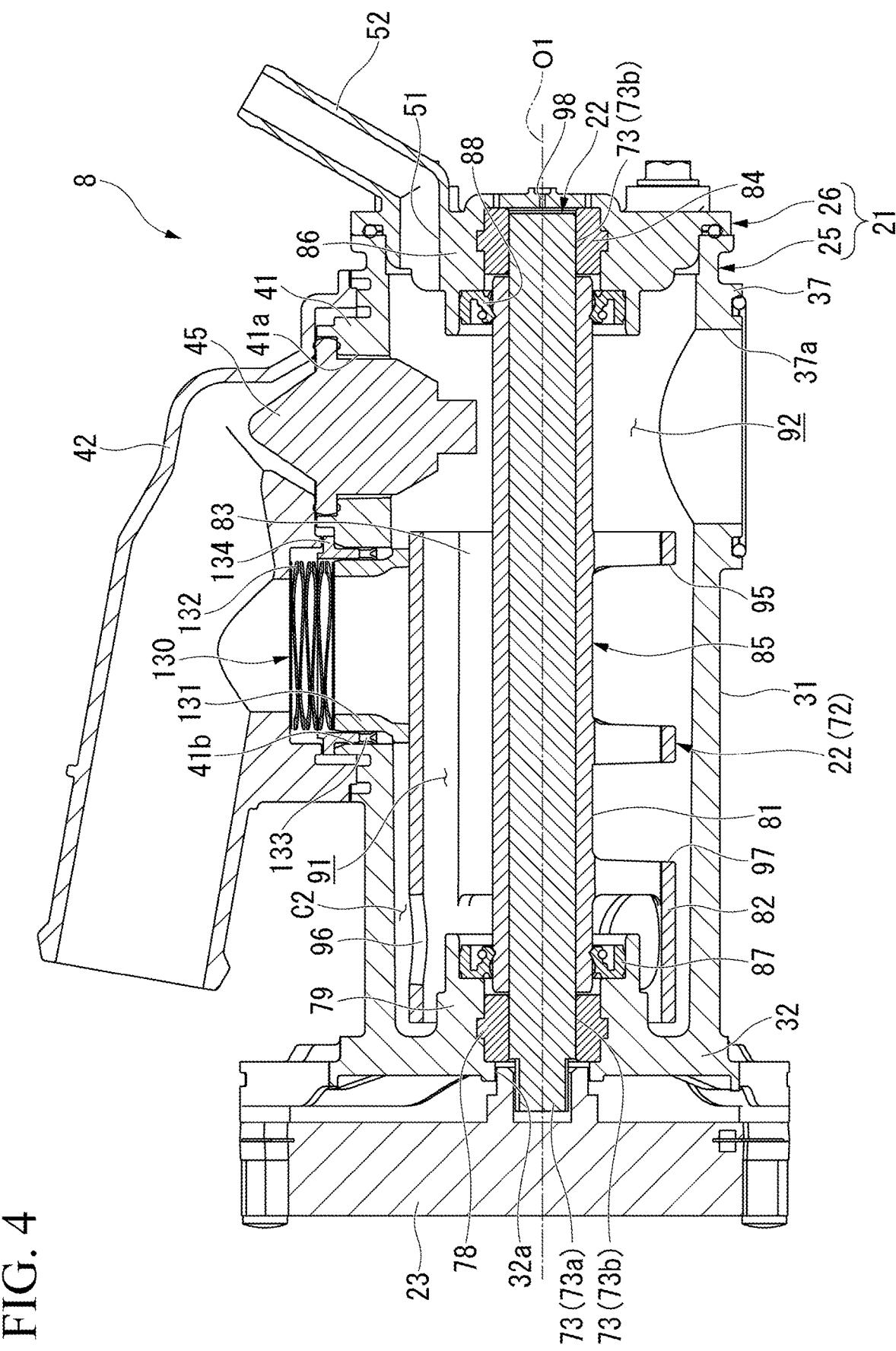
FIG. 4 is a cross-sectional view taken along line IV-IV of FIG. 2.

FIG. 4 is a cross-sectional view taken along line IV-IV of FIG. 2.

As illustrated in FIGS. 3 and 4, an inflow port 37 that bulges outward in the case radial direction is formed at a portion of the case circumferential wall 31 positioned on the second side. An inlet 37a (see FIG. 4) penetrating the inflow port 37 in the case radial direction is formed in the inflow port 37. The inlet 37a allows the inside and outside of the casing 21 to communicate. The main flow path 10 (see FIG. 1) described above is connected to an opening end surface (an outer end surface in the case radial direction) of the inflow port 37.

As illustrated in FIG. 4, in the case circumferential wall 31, a radiator port 41 which bulges outward in the case radial direction is formed at a position facing the inflow port 37 in the case radial direction with the axis O1 therebetween. In the radiator port 41, a fail opening 41a and a radiator outlet 41b (outlet) are formed to be aligned in the case axial direction. The fail opening 41a and the radiator outlet 41b each penetrates the radiator port 41 in the case radial direction. In the present embodiment, the fail opening 41a faces the above-described inlet 37a in the case radial direction. Also, the radiator outlet 41b is positioned on the first side in the case axial direction with respect to the fail opening 41a.

A radiator joint 42 is connected to an opening end surface (outer end surface in the case radial direction) of the radiator port 41. The radiator joint 42 connects the radiator port 41 and an upstream end portion of the radiator flow path 11 (see FIG. 1). The radiator joint 42 is welded (for example, vibration welding or the like) to the opening end surface of the radiator port 41.

A thermostat 45 is provided in the fail opening 41a. The thermostat 45 faces the above-described inlet 37a in the case radial direction. The thermostat 45 opens and closes the fail opening 41a according to a temperature of cooling water flowing in the casing 21.

An EGR outlet 51 is formed in a portion of the lid body 26 positioned close to the radiator port 41 in the case radial direction with respect to the axis O1. The EGR outlet 51 penetrates the lid body 26 in the case axial direction. In the present embodiment, the EGR outlet 51 intersects (is perpendicular to) an opening direction of the fail opening 41*a* (case radial direction). Also, at least a portion of the EGR outlet 51 overlaps the thermostat 45 in a front view when viewed from the case axial direction.

An EGR joint 52 is formed at an opening edge of the EGR outlet 51 in the lid body 26. The EGR joint 52 is formed in a tubular shape extending outward in the case radial direction toward the second side in the case axial direction and connects the EGR outlet 51 and an upstream end portion of the EGR flow path 14 described above (see FIG. 1).

As illustrated in FIG. 3, a warm-up port 56 bulging outward in the case radial direction is formed at a portion of the case circumferential wall 31 positioned on the first side in the case axial direction with respect to the radiator port 41. A warm-up outlet 56*a* (outlet) penetrating the warm-up port 56 in the case radial direction is formed in the warm-up port 56. A warm-up joint 62 is connected to an opening end surface of the warm-up port 56. The warm-up joint 62 connects the warm-up port 56 and an upstream end portion of the warm-up flow path 12 (see FIG. 1) described above. Further, the warm-up joint 62 is welded (for example, vibration welding or the like) to the opening end surface of the warm-up port 56.

As illustrated in FIGS. 2 and 3, an air conditioning port 66 is formed at a position of the case circumferential wall 31 shifted by about 180° in the case circumferential direction with respect to the warm-up port 56 between the radiator port 41 and the warm-up port 56 in the case axial direction. An air conditioning outlet 66*a* (outlet) penetrating the air conditioning port 66 in the case radial direction is formed in the air conditioning port 66. An air conditioning joint 68 is connected to an opening end surface of the air conditioning port 66. The air conditioning joint 68 connects the air conditioning port 66 and an upstream end portion of the air conditioning flow path 13 (see FIG. 1) described above. Further, the air conditioning joint 68 is welded (for example, vibration welding or the like) to the opening end surface of the air conditioning port 66.

(Drive Unit)

As illustrated in FIG. 2, the drive unit 23 is attached to the bottom wall portion 32 of the casing main body 25. In the drive unit 23, a motor, a speed reduction mechanism, a control board, and the like (not illustrated) are housed in a unit case.

(Rotor)

As illustrated in FIGS. 3 and 4, the valve body 22 is accommodated in the casing 21. The valve body 22 is formed in a cylindrical shape and is disposed coaxially with the axis O1 of the casing 21 inside the casing 21. The valve body 22 opens and closes each of the outlets (the radiator outlet 41*b*, the warm-up outlet 56*a*, and the air conditioning outlet 66*a*) by rotating around the axis O1.

As illustrated in FIG. 4, the valve body 22 is configured such that an inner shaft portion 73 is insert-molded inside a rotor main body 72. The inner shaft portion 73 extends coaxially with the axis O1.

A first side end portion of the inner shaft portion 73 penetrates the bottom wall portion 32 in the case axial direction through a through-hole (atmospheric opening) 32*a* formed in the bottom wall portion 32. The first side end portion of the inner shaft portion 73 is rotatably supported by a first bush (first bearing) 78 provided on the bottom wall portion 32 described above.

Specifically, a first shaft accommodating wall 79 is formed in the bottom wall portion 32 toward the second side in the case axial direction. The first shaft accommodating wall 79 surrounds the through-hole 32*a* described above. The first bush 78 described above is fitted to the inside of the first shaft accommodating wall 79.

A connecting portion 73*a* is formed on a portion of the inner shaft portion 73 positioned on the first side in the case axial direction (a portion positioned on an outer side of the bottom wall portion 32) with respect to the first bush 78. The connecting portion 73*a* is connected to the above-described drive unit 23 outside the casing 21.

Thereby, power of the drive unit 23 is transmitted to the inner shaft portion 73.

A second side end portion of the inner shaft portion 73 is rotatably supported by a second bush (second bearing) 84 provided in the lid body 26 described above. Specifically, a second shaft accommodating wall 86 is formed in the lid body 26 toward the first side in the case axial direction. The second shaft accommodating wall 86 surrounds the axis O1 at an inner side of the above-described EGR outlet 51 in the case radial direction. The second bush 84 described above is fitted to the inside of the second shaft accommodating wall 86.

The rotor main body 72 surrounds the periphery of the inner shaft portion 73 described above. The rotor main body 72 includes an outer shaft portion 81 covering the inner shaft portion 73, a circumferential wall portion 82 surrounding the outer shaft portion 81, and a spoke portion 83 connecting the outer shaft portion 81 and the circumferential wall portion 82.

The outer shaft portion 81 surrounds the periphery of the inner shaft portion 73 over the entire circumference in a state in which both end portions in the case axial direction of the inner shaft portion 73 are exposed. In the present embodiment, the outer shaft portion 81 and the inner shaft portion 73 constitute a rotating shaft 85 of the valve body 22.

In the first shaft accommodating wall 79 described above, a first lip seal 87 is provided at a portion positioned on the second side in the case axial direction with respect to the first bush 78. The first lip seal 87 seals between an inner circumferential surface of the first shaft accommodating wall 79 and an outer circumferential surface of the rotating shaft 85 (outer shaft portion 81). In the first shaft accommodating wall 79, a portion positioned on the first side of the first lip seal 87 in the case axial direction is open to the atmosphere through the through-hole 32*a*.

On the other hand, in the second shaft accommodating wall 86 described above, a second lip seal 88 is provided at a portion positioned on the first side in the case axial direction with respect to the second bush 84. The second lip seal 88 seals between an inner circumferential surface of the second shaft accommodating wall 86 and the outer circumferential surface of the rotating shaft 85 (outer shaft portion 81). A through-hole (atmospheric opening) 98 which penetrates the lid body 26 in the case axial direction is formed in the lid body 26.

The circumferential wall portion 82 of the valve body 22 is disposed coaxially with the axis O1. In the casing 21, the circumferential wall portion 82 is disposed at a portion positioned on the first side in the case axial direction with respect to the inlet 37*a*. Specifically, the circumferential wall portion 82 is disposed at a position avoiding the fail opening 41*a* and straddling the radiator outlet 41*b*, the warm-up outlet 56*a*, and the air conditioning outlet 66*a* in the case axial direction. An inner side of the circumferential wall portion 82 forms a flow path 91 through which cooling water which has flowed into the casing 21 through the inlet 37*a* flows in the case axial direction. On the other hand, in the casing 21, a portion positioned on the second side in the case axial direction with respect to the circumferential wall portion 82 forms a connection flow path 92 that communicates with the flow path 91. A gap C2 is provided in the case radial direction between an outer circumferential surface of the circumferential wall portion 82 and an inner circumferential surface of the case circumferential wall 31.

A valve hole 95 penetrating the circumferential wall portion 82 in the case radial direction is formed at the same position in the case axial direction as the above-described radiator outlet 41*b* in the circumferential wall portion 82. When at least a portion of the valve hole 95 overlaps a seal cylindrical member 131 inserted in the radiator outlet 41*b* when viewed from the case radial direction, the inside of the circumferential wall portion 82 (flow path 91) and the radiator outlet 41*b* are allowed to communicate with each other through the valve hole 95.

Another valve hole 96 penetrating the circumferential wall portion 82 in the case radial direction is formed at the same position in the case axial direction as the above-described warm-up outlet 56*a* in the circumferential wall portion 82. When at least a portion of the valve hole 96 overlaps the seal cylindrical member 131 inserted in the warm-up outlet 56*a* when viewed from the case radial direction, the inside of the circumferential wall portion 82 (flow path 91) and the warm-up outlet 56*a* are allowed to communicate with each other through the valve hole 96.

Another valve hole 97 penetrating the circumferential wall portion 82 in the case radial direction is formed at the same position in the case axial direction as the above-described air conditioning outlet 66*a* in the circumferential wall portion 82. When at least a portion of the valve hole 97 overlaps the seal cylindrical member 131 inserted in the air conditioning outlet 66*a* when viewed from the case radial direction, the inside of the circumferential wall portion 82 (flow path 91) and the air conditioning outlet 66*a* are allowed to communicate with each other through the valve hole 97.

The valve body 22 switches between communication and shutoff between the valve holes 95, 96, and 97 and the respective corresponding outlets 41*b*, 56*a*, and 66*a* as the valve body 22 rotates around the axis O1. Further, communication patterns of the valve holes 95, 96, and 97 with the outlets 41*b*, 56*a*, and 66*a* can be set as appropriate.

Next, details of a portion connecting the warm-up port 56 and the warm-up joint 62 will be described. Since a portion connecting the radiator port 41 and the radiator joint 42 and a portion connecting the air conditioning port 66 and the air conditioning joint 68 have the same configuration as the portion connecting the warm-up port 56 and the warm-up joint 62, description thereof will be omitted.

Figure 5:
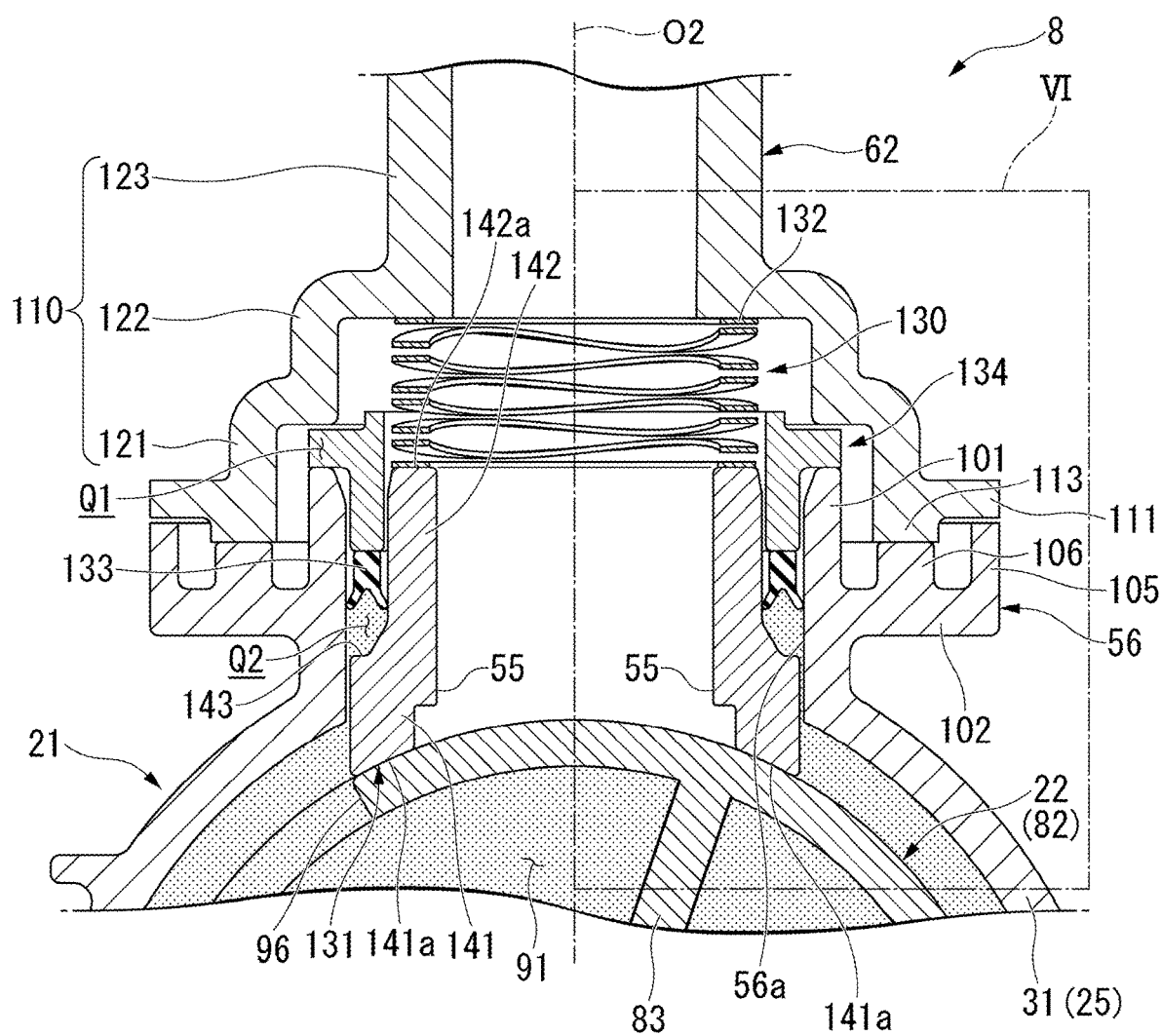
FIG. 5 is an enlarged view taken along line V-V of FIG. 2.

FIG. 5 is an enlarged cross-sectional view corresponding to line V-V in FIG. 2. In the following description, a direction along an axis O2 of the warm-up outlet 56*a* is referred to as a port axial direction (first direction) in some cases. In this case, in the port axial direction, a direction toward the axis O1 with respect to the warm-up port 56 is referred to as an inner side, and a direction away from the axis O1 with respect to the warm-up port 56 is referred to as an outer side. Also, a direction perpendicular to the axis O2 is referred to as a port radial direction (second direction), and a direction around the axis O2 is referred to as a port circumferential direction in some cases.

As illustrated in FIG. 5, the warm-up port 56 includes a seal cylindrical portion 101 extending in the port axial direction, and a port flange portion 102 protruding outward in the port radial direction from the seal cylindrical portion 101. An inner side of the seal cylindrical portion 101 forms the above-described warm-up outlet 56*a* (outlet). In the present embodiment, an inner diameter of the seal cylindrical portion 101 is uniformly set in a region excluding an outer end portion in the port axial direction.

A surrounding wall 105 protruding outward in the port axial direction is formed on an outer circumferential portion of the port flange portion 102. The surrounding wall 105 is formed over an entire circumference of the port flange portion 102. In the port flange portion 102, a port joining portion 106 protruding outward in the port axial direction is formed at a portion positioned on an inner side with respect to the surrounding wall 105 in the port radial direction.

The port joining portion 106 is formed over the entire circumference of the port flange portion 102.

The warm-up joint 62 includes a joint cylindrical portion 110 disposed coaxially with the axis O2, and a joint flange portion 111 protruding outward in the port radial direction from an inner end portion in the port axial direction of the joint cylindrical portion 110.

The joint flange portion 111 is formed in an annular shape in which an outer diameter thereof is the same as that of the port flange portion 102 and an inner diameter thereof is greater than an outer diameter of the seal cylindrical portion 101. A joint joining portion 113 protruding inward in the port axial direction is formed at an inner circumferential portion of the joint flange portion 111. The joint joining portion 113 faces the port joining portion 106 in the port axial direction.

The warm-up port 56 and the warm-up joint 62 are joined to each other by vibration welding between facing surfaces of the port joining portion 106 and the joint joining portion 113.

The joint cylindrical portion 110 extends outward in the port axial direction from an inner circumferential edge of the joint flange portion 111. The joint cylindrical portion 110 is formed in a multistage cylindrical shape which decreases in diameter in stages toward an outer side in the port axial direction. Specifically, in the joint cylindrical portion 110, a large diameter portion 121, a medium diameter portion 122, and a small diameter portion 123 are continuous in order toward the outer side in the port axial direction.

The large diameter portion 121 surrounds the seal cylindrical portion 101 in a state in which a distance is provided on an outer side in the port radial direction with respect to the above-described seal cylindrical portion 101. The medium diameter portion 122 faces the seal cylindrical portion 101 with a gap Q1 in the port axial direction.

A seal mechanism 130 is provided at a portion surrounded by the warm-up port 56 and the warm-up joint 62. The seal mechanism 130 includes the seal cylindrical member 131, a biasing member 132, a seal ring 133, and a holder 134. Further, as illustrated in FIG. 3, seal mechanisms 130 having the same configuration as the seal mechanism 130 provided in the warm-up port 56 are provided also in the radiator port 41 and the air conditioning port 66 described above. In the present embodiment, the seal mechanisms 130 provided in the radiator port 41 and the air conditioning port 66 are denoted by the same references as the seal mechanism 130 provided in the warm-up port 56, and description thereof will be omitted.

As illustrated in FIG. 5, the seal cylindrical member 131 is inserted into the warm-up outlet 56a. The seal cylindrical member 131 has a circumferential wall extending coaxially with the axis O2. The circumferential wall of the seal cylindrical member 131 is formed in a multistage cylindrical shape which decreases in outer diameter in stages toward an outer side in the port axial direction. Specifically, the circumferential wall of the seal cylindrical member 131 includes a first cylindrical portion 142 positioned on an outer side in the port axial direction (one end side in the axial direction) to communicate with a downstream side of the warm-up outlet 56a, and a second cylindrical portion 141 positioned on an inner side in the port axial direction (the other end side in the axial direction) and having a larger inner diameter and outer diameter than the first cylindrical portion 142.

The large diameter second cylindrical portion 141 of the seal cylindrical member 131 is slidably inserted into an inner circumferential surface of the seal cylindrical portion 101. An inner end surface in the port axial direction of the second cylindrical portion 141 constitutes a valve sliding contact surface 141a that is slidably in contact with the outer circumferential surface of the circumferential wall portion 82 of the valve body 22. In the present embodiment, the valve sliding contact surface 141a is a curved surface formed to follow a radius of curvature of the outer circumferential surface of the circumferential wall portion 82.

An outer circumferential surface of the first cylindrical portion 142 is continuous with an outer circumferential surface of the second cylindrical portion 141 via a stepped surface 143. The stepped surface 143 is inclined outward in the port radial direction as it goes inward in the port axial direction and then further extended outward in the port radial direction. Therefore, a seal gap Q2 is provided in the port radial direction between the outer circumferential surface of the small diameter first cylindrical portion 142 and the inner circumferential surface of the seal cylindrical portion 101.

An outer end surface in the port axial direction of the first cylindrical portion 142 (hereinafter, referred to as "seating surface 142a") is a flat surface perpendicular to the port axial direction. The seating surface 142a of the first cylindrical portion 142 is disposed at the same position as an outer end surface of the seal cylindrical portion 101 in the port axial direction. Further, the seal cylindrical member 131 is separated from the warm-up joint 62 in the port radial direction and the port axial direction.

The biasing member 132 is interposed between the seating surface 142a of the seal cylindrical member 131 and an inner end surface in the port axial direction of the small diameter portion 123 of the warming-up joint 62. The biasing member 132 may be, for example, a wave spring. The biasing member 132 biases the seal cylindrical member 131 inward in the port axial direction (toward the circumferential wall portion 82).

The seal ring 133 may be, for example, a Y packing. The seal ring 133 is externally fitted to the first cylindrical portion 142 of the seal cylindrical member 131 with an opening (forked portion) thereof facing inward in the port axial direction. Specifically, in a state in which the seal ring 133 is disposed in the seal gap Q2 described above, distal end portions of the forked portion of the seal ring 133 are slidably in close contact with the outer circumferential surface of the first cylindrical portion 142 and the inner circumferential surface of the seal cylindrical portion 101, respectively. Further, in the seal gap Q2, a fluid pressure of the casing 21 is introduced to an inner region in the port axial direction with respect to the seal ring 133 through a gap between the inner circumferential surface of the seal cylindrical portion 101 and the second cylindrical portion 141 of the seal cylindrical member 131. The stepped surface 143 is formed in a direction opposite to the valve sliding contact surface 141a of the seal cylindrical member 131 in the port axial direction. The stepped surface 143 forms a pressure receiving surface that receives a fluid pressure of cooling water in the casing 21 and is pressed inward in the port axial direction.

Figure 6:
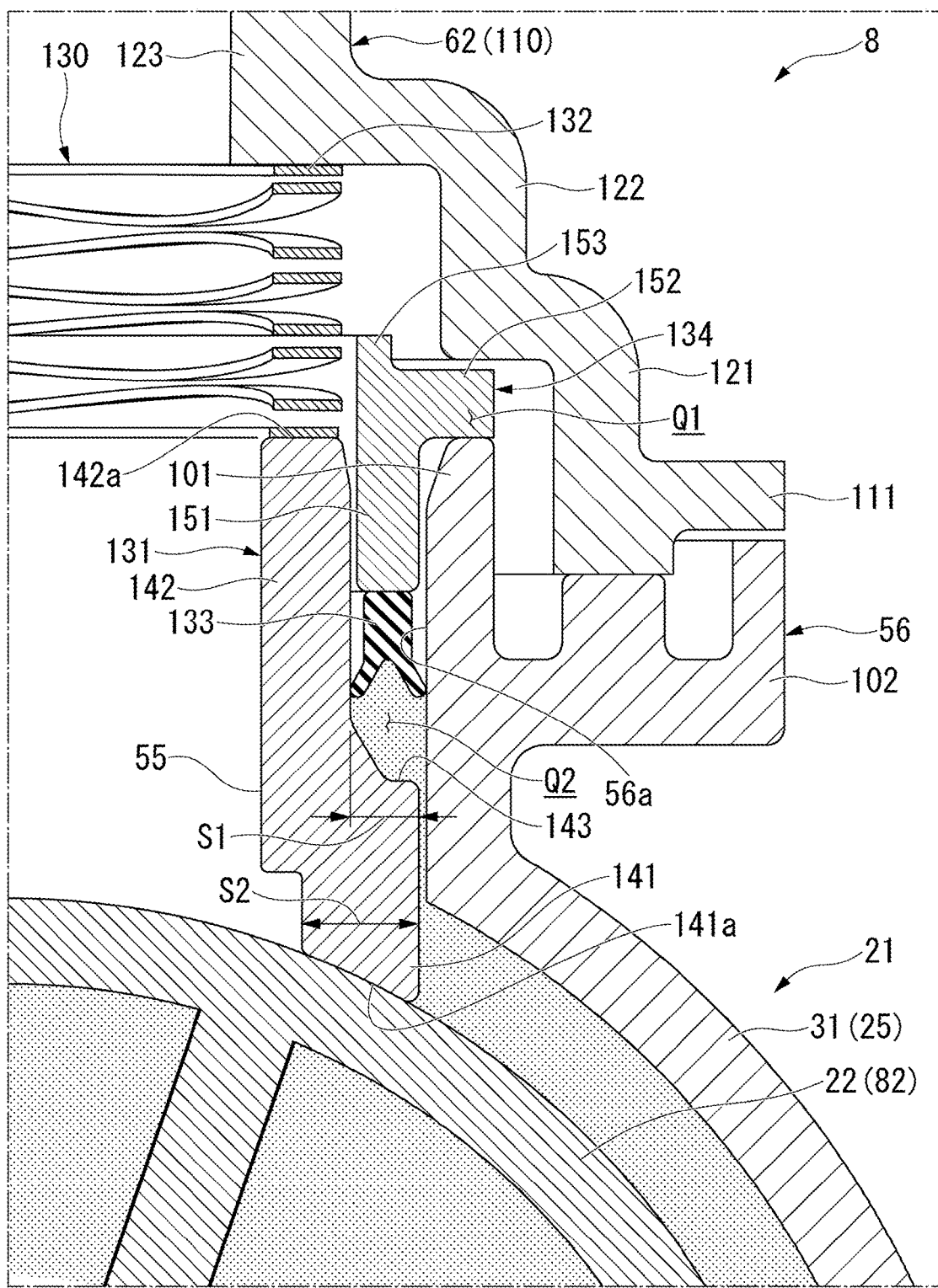
FIG. 6 is an enlarged view of a portion VI of FIG. 5.

FIG. 6 is an enlarged view of a VI portion of FIG. 5.

Here, in the seal cylindrical member 131, an area S1 of the stepped surface 143 and an area S2 of the valve sliding contact surface 141a are set to satisfy the following Expressions (1) and (2).

$$S1 < S2 \leq S1/k \quad (1)$$

$$\alpha \leq k < 1 \quad (2)$$

k: A pressure reduction constant of cooling water flowing in a minute gap between the valve sliding contact surface 141a and the circumferential wall portion 82 of the valve body 22

α: A lower limit value of the pressure reduction constant determined by physical properties of cooling water Further, the area S1 of the stepped surface 143 and the area S2 of the valve sliding contact surface 141a mean areas when these are projected in the port axial direction.

α in Expression (2) is a standard value of the pressure reduction constant decided by types of cooling water, a usage environment (for example, temperature), or the like. For example, in a case of water under normal conditions of use, α=½ is satisfied. When physical properties of cooling water to be used change, it changes to α=⅓ or the like.

Also, when the valve sliding contact surface 141a is uniformly in contact with the circumferential wall portion 82 from an outer end edge to an inner end edge in the port radial direction, the pressure reduction constant k in Expression (2) is α (for example, ½), which is the standard value of the pressure reduction constant. However, the gap between the outer circumferential portion of the valve sliding contact surface 141a and the circumferential wall portion 82 may be slightly increased with respect to the inner circumferential portion of the valve sliding contact surface 141a due to a manufacturing error, an assembly error, or the like of the seal cylindrical member 131. In this case, the pressure reduction constant k in Equation (2) gradually approaches k=1.

In the present embodiment, the relationship between the area S1 of the respective stepped surface 143 and the area S2 of the valve sliding contact surface 141a is determined by Expressions (1) and (2) on the premise that there is a minute gap to allow sliding between the valve sliding contact surface 141a of the seal cylindrical member 131 and the outer circumferential surface of the circumferential wall portion 82.

That is, as described above, a pressure of cooling water in the casing 21 acts on the stepped surface 143 of the seal cylindrical member 131 as it is. On the other hand, a pressure of the cooling water in the casing 21 does not act on the valve sliding contact surface 141a as it is. Specifically, the pressure of the cooling water acts while accompanying pressure reduction when the cooling water flows from the outer end edge toward the inner end edge in the port radial direction through a minute gap between the valve sliding contact surface 141a and the circumferential wall portion 82. At this time, the pressure of the cooling water tries to push up the seal cylindrical member 131 outward in the port axial direction while the pressure of the cooling water gradually decreases inward in the port radial direction.

As a result, a force obtained by multiplying the area S1 of the stepped surface 143 by a pressure P in the casing 21 acts on the stepped surface 143 of the seal cylindrical member 131 as it is. On the other hand, a force obtained by multiplying the area S2 of the valve sliding contact surface 141a by the pressure P in the casing 21 and the pressure reduction constant k acts on the valve sliding contact surface 141a of the seal cylindrical member 131.

In the control valve 8 of the present embodiment, as is apparent from Expression (1), the areas S1 and S2 are set such that k×S2≤S1 is satisfied. Therefore, a relationship of P×k×S2≤P×S1 is also satisfied.

Therefore, a force F1 (F1=P×S1) in a pressing direction acting on the stepped surface 143 of the seal cylindrical member 131 increases to be equal to or greater than a force F2 (F2=P×k×S2) in a lifting direction acting on the valve sliding contact surface 141a of the seal cylindrical member 131. Therefore, in the control valve 8 of the present embodiment, a space between the seal cylindrical member 131 and the circumferential wall portion 82 can be sealed only by the relationship of a pressure of cooling water in the casing 21.

On the other hand, in the present embodiment, as described above, the area S1 of the stepped surface 143 of the seal cylindrical member 131 is smaller than the area S2 of the valve sliding contact surface 141a. Therefore, even when a pressure of cooling water in the casing 21 is increased, the valve sliding contact surface 141a of the seal cylindrical member 131 being pressed against the circumferential wall portion 82 with an excessive force can be inhibited. Therefore, when the control valve 8 of the present embodiment is employed, a size and output of the drive unit 23 for rotationally driving the valve body 22 can be prevented from increasing, and furthermore, abrasion of the seal cylindrical member 131 and the bushes 78 and 84 (see FIG. 4) at an early stage can be inhibited.

As described above, in the present embodiment, the area S2 of the valve sliding contact surface 141a is set to be larger than the area S1 of the stepped surface 143 in a range in which the force pressing inward in the port axial direction to act on the seal cylindrical member 131 is not lower than the force lifting outward in the port axial direction to act on the seal cylindrical member 131. Therefore, the space between the seal cylindrical member 131 and the circumferential wall portion 82 can be sealed while inhibiting the pressing of the seal cylindrical member 131 against the circumferential wall portion 82 with an excessive force.

The holder 134 described above is configured to be movable in the port axial direction with respect to the warm-up port 56 and the warm-up joint 62 in the gap Q1. Also, the holder 134 is disposed to be separable in the port axial direction from at least one of the warm-up port 56 and the warm-up joint 62. The holder 134 includes a holder cylindrical portion 151, a holder flange portion 152, and a restriction portion 153.

The holder cylindrical portion 151 extends in the port axial direction. The holder cylindrical portion 151 is inserted into the seal gap Q2 from the outside in the port axial direction. A bottom portion of the seal ring 133 described above can be brought into contact with an inner end surface in the port axial direction of the holder cylindrical portion 151. That is, the holder cylindrical portion 151 restricts outward movement of the seal ring 133 in the port axial direction.

The holder flange portion 152 protrudes outward in the port radial direction from an outer end portion in the port axial direction of the holder cylindrical portion 151. The holder flange portion 152 is disposed in the gap Q1 between the outer end surface in the port axial direction of the seal cylindrical portion 101 and an inner end surface in the port axial direction of the medium diameter portion 122. Inward movement of the holder 134 in the port axial direction is restricted by the seal cylindrical portion 101, and outward movement of the holder 134 in the port axial direction is restricted by the medium diameter portion 122.

The restriction portion 153 is formed to protrude in a cylindrical shape outward in the port axial direction from an inner circumferential portion of the holder cylindrical portion 151. The restriction portion 153 restricts movement of the biasing member 132 in the port radial direction together with the holder cylindrical portion 151.

[Details of Seal Cylindrical Member]

Figure 7:
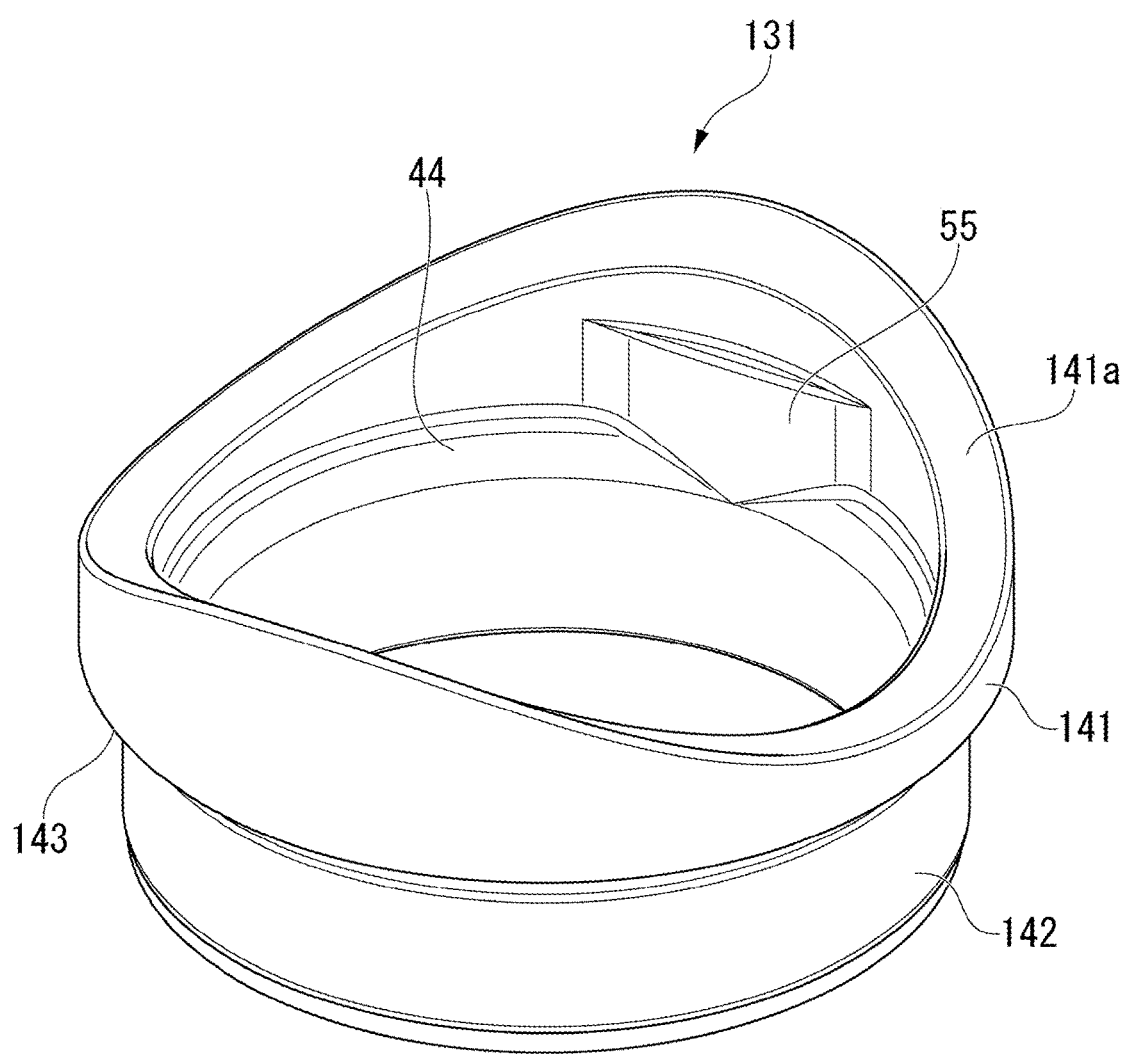
FIG. 7 is a perspective view of a seal cylindrical member according to the embodiment.
Figure 8:
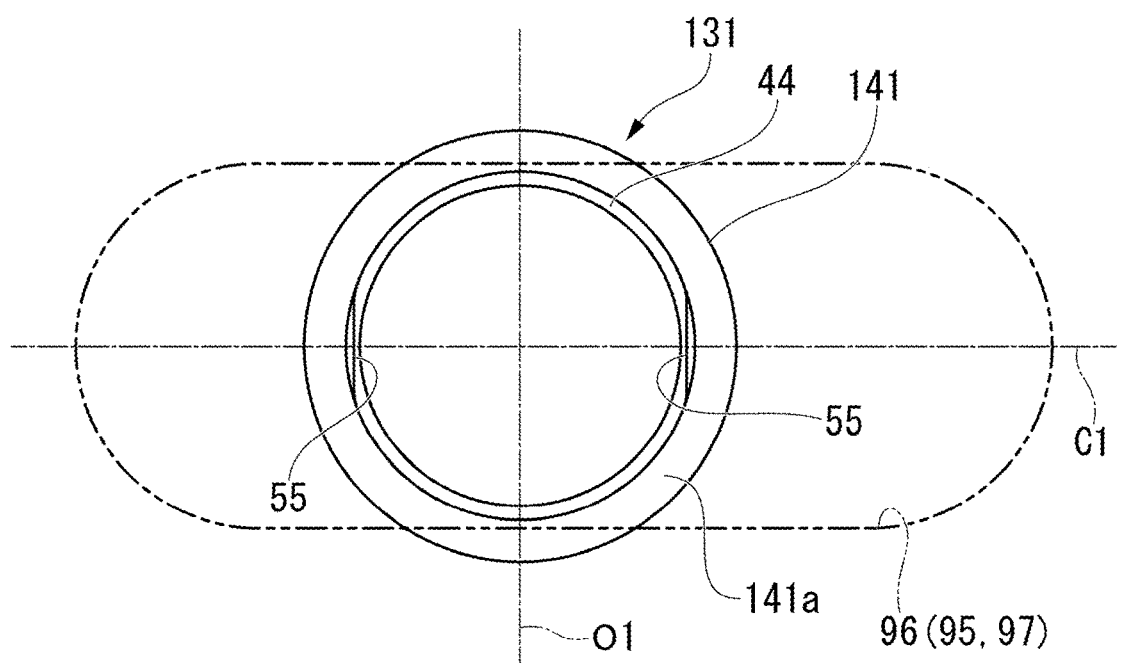
FIG. 8 is an end surface view of the seal cylindrical member according to the embodiment.

FIG. 7 is a perspective view of the seal cylindrical member 131 when viewed with the valve sliding contact surface 141a side up. FIG. 8 is an end surface view of the seal cylindrical member 131 when viewed from the valve sliding contact surface 141a side. Further, in FIG. 8, the valve hole 96 (95, 97) of the circumferential wall portion 82 of the valve body 22 is illustrated by a virtual line.

The seal cylindrical member 131 includes the first cylindrical portion 142 and the second cylindrical portion 141 having the outer diameter larger than the first cylindrical portion 142, and the valve sliding contact surface 141a which is slidably in contact with the outer circumferential surface of the circumferential wall portion 82 of the valve body 22 is provided at an end portion in the axial direction (the other end portion in the axial direction) of the second cylindrical portion 141. The stepped surface 143 is provided between the outer circumferential surface of the first cylindrical portion 142 and the outer circumferential surface of the second cylindrical portion 141. Also, an inner diameter of the first cylindrical portion 142 is formed to be smaller than an inner diameter of the second cylindrical portion 141. A stepped surface 44 is provided between an inner circumferential surface of the first cylindrical portion 142 and an inner circumferential surface of the second cylindrical portion 141.

In a circumferential wall of the axial end portion (inner side in the port axial direction) of the second cylindrical portion 141, a protrusion height in a direction toward the circumferential wall portion 82 changes continuously in the circumferential direction along a shape of the outer circumferential surface of the circumferential wall portion 82 of the valve body 22. In other words, the protrusion height of the circumferential wall of the axial end portion of the second cylindrical portion 141 changes continuously so that the valve sliding contact surface 141a is in surface contact with the outer circumferential surface of the circumferential wall portion 82 of the valve body 22. The end portion in the axial direction of the second cylindrical portion 141 has a lowest protrusion height in a region positioned on an outermost side with respect to a direction along the axis O1 (rotation axis of the valve body 22) and has a highest protrusion height in a region positioned on an outermost side with respect to a direction perpendicular to the axis O1 (direction along a rotational direction of the valve body 22). Further, reference C1 in FIG. 8 is a central line illustrating a center of the valve hole 96 (95, 97) in the axis O1 direction of the valve body 22.

In the seal cylindrical member 131, a thick portion 55 is provided at two regions (two regions including a portion at which the protrusion height in the direction of the valve body 22 is maximum) of the circumferential wall of the second cylindrical portion 141 at which the protrusion height in a direction toward the circumferential wall portion 82 of the valve body 22 (hereinafter referred to as "protrusion height in the direction of the valve body 22") is high. Each of the thick portions 55 is provided to bulge radially inward from an inner circumferential portion of the second cylindrical portion 141.

As illustrated in FIG. 8, the thick portions 55 disposed at the two positions are formed to be parallel to each other when the seal cylindrical member 131 is viewed from the axial direction (port axial direction). On a radial inner side of the second cylindrical portion 141, linear inner edge portions facing each other are formed by the thick portions 55. In the case of the present embodiment, a portion in which the thick portion 55 is the thickest is disposed at a portion in which the protrusion height of the end portion of the second cylindrical portion 141 is the highest.

Further, the thick portion 55 is preferably formed not to protrude radially inward of the inner diameter of the first cylindrical portion 142.

Also, while the thick portion 55 is formed to bulge radially inward from the inner circumferential surface of the second cylindrical portion 141, the thick portion 55 extends from a portion of the stepped surface 44 between the first cylindrical portion 142 and the second cylindrical portion 141 to a region not reaching the valve sliding contact surface 141*a* of the second cylindrical portion 141 (end surface of the other end portion of the seal cylindrical member 131 in the axial direction). The valve sliding contact surface 141*a* formed on the end surface of the second cylindrical portion 141 on the valve body 22 side is formed to have a substantially constant radial width throughout in the circumferential direction of the seal cylindrical member 131.

[Operation Method of Control Valve]

Next, an operation method of the control valve 8 described above will be described.

As illustrated in FIG. 1, in the main flow path 10, cooling water sent out by the water pump 3 is subject to heat exchange at the engine 2 and then flows toward the control valve 8. As illustrated in FIG. 4, the cooling water that has passed through the engine 2 in the main flow path 10 flows into the connection flow path 92 in the casing 21 through the inlet 37*a*.

Of the cooling water that has flowed into the connection flow path 92, some of the cooling water flows into the EGR outlet 51. The cooling water that has flowed into the EGR outlet 51 is supplied into the EGR flow path 14 through the EGR joint 52. The cooling water that has been supplied into the EGR flow path 14 is returned to the main flow path 10 after heat exchange between the cooling water and an EGR gas is performed in the EGR cooler 7.

On the other hand, in the cooling water which has flowed into the connection flow path 92, cooling water which has not flowed into the EGR outlet 51 flows into the flow path 91 from the second side in the case axial direction. The cooling water which has flowed into the flow path 91 is distributed to the respective outlets in the process of flowing in the flow path 91 in the case axial direction. That is, the cooling water which has flowed into the flow path 91 is distributed to the respective flow paths 11 to 13 through the outlets communicating with corresponding valve holes among the respective outlets.

In the control valve 8, in order to switch a communication pattern between the valve holes and the outlets, the valve body 22 is rotated around the axis O1. Then, when rotation of the valve body 22 is stopped at a position which corresponds to a communication pattern to be set, the valve hole and the outlet communicate with each other by the communication pattern corresponding to the stopped position of the valve body 22.

As described above, in the control valve 8 of the present embodiment, the thick portion 55 which is thicker compared to other portions is provided in a region at which the protrusion height in the direction of the valve body 22 is high in the circumferential wall of the end portion in the axial direction of the seal cylindrical member 131. Therefore, in the circumferential wall of the end portion in the axial direction of the seal cylindrical member 131, a region in which bending deformation is likely to be caused due to a fluid pressure of cooling water in the casing 21 can be reinforced by the thick portion 55. As a result, variation in bending in the circumferential region of the seal cylindrical member 131 due to change in the protrusion height of the end portion in the axial direction of the seal cylindrical member 131 can be reduced. Therefore, when the control valve 8 of the present embodiment is employed, sealing between the seal cylindrical member 131 and the valve body 22 can be enhanced.

Particularly, in the control valve 8 of the present embodiment, the thick portion 55 is provided to bulge radially inward of the circumferential wall of the seal cylindrical member 131. Therefore, a pressure of cooling water inside the casing 21 that acts from a radial outer side of the seal cylindrical member 131 can be efficiently received by the radial inner side of the seal cylindrical member 131. Therefore, when the configuration of the present embodiment is employed, bending deformation of the end portion of the seal cylindrical member 131 on the valve body 22 side can be more efficiently inhibited.

Also, in the control valve 8 of the present embodiment, the thick portion 55 is provided in a region which does not reach the end surface in the axial direction of the seal cylindrical member 131, and the valve sliding contact surface 141*a* which is the end surface in the axial direction of the seal cylindrical member 131 is formed to have a substantially constant radial width throughout in the circumferential direction of the seal cylindrical member 131. Therefore, variation in surface pressure in the circumferential direction of the valve sliding contact surface 141*a* can be reduced while variation in bending in the circumferential direction of the seal cylindrical member 131 can be reduced by the thick portion 55. Therefore, when the configuration of the present embodiment is employed, sealing between the valve sliding contact surface 141*a* of the seal cylindrical member 131 and the circumferential wall portion 82 of the valve body 22 can be further enhanced.

Further, in the control valve 8 of the present embodiment, the first cylindrical portion 142 communicating with the outlet of the casing 21 and the second cylindrical portion 141 having the valve sliding contact surface 141*a* are provided in the seal cylindrical member 131, an inner diameter of the first cylindrical portion 142 is formed to be smaller than an inner diameter of the second cylindrical portion 141, and the thick portion 55 is provided on the radial inner side of the second cylindrical portion 141. Therefore, since a flow rate of cooling water flowing out to a downstream side of the outlet through the seal cylindrical member 131 is determined by the inner diameter of the first cylindrical portion 142, the thick portion 55 provided in the second cylindrical portion 141 having a large inner diameter does not affect the flow rate of the cooling water flowing out from the outlet. Therefore, when the configuration of the present embodiment is employed, a flow rate of a liquid flowing out from the outlet can be easily set and regulated.

Another Embodiment

Figure 9:
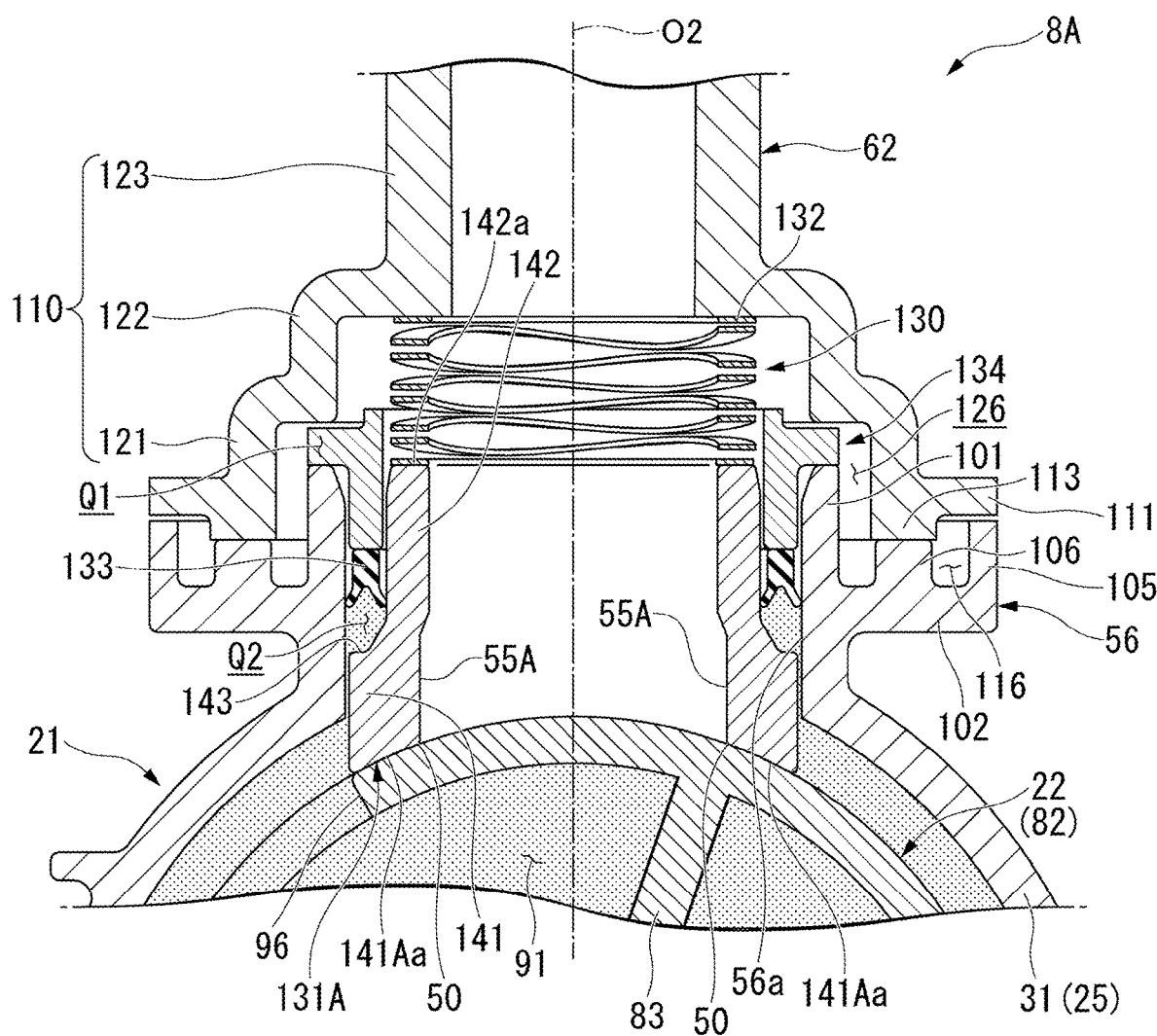
FIG. 9 is an enlarged view similar to FIG. 5 when a seal cylindrical member according to anther embodiment is used.
Figure 10:
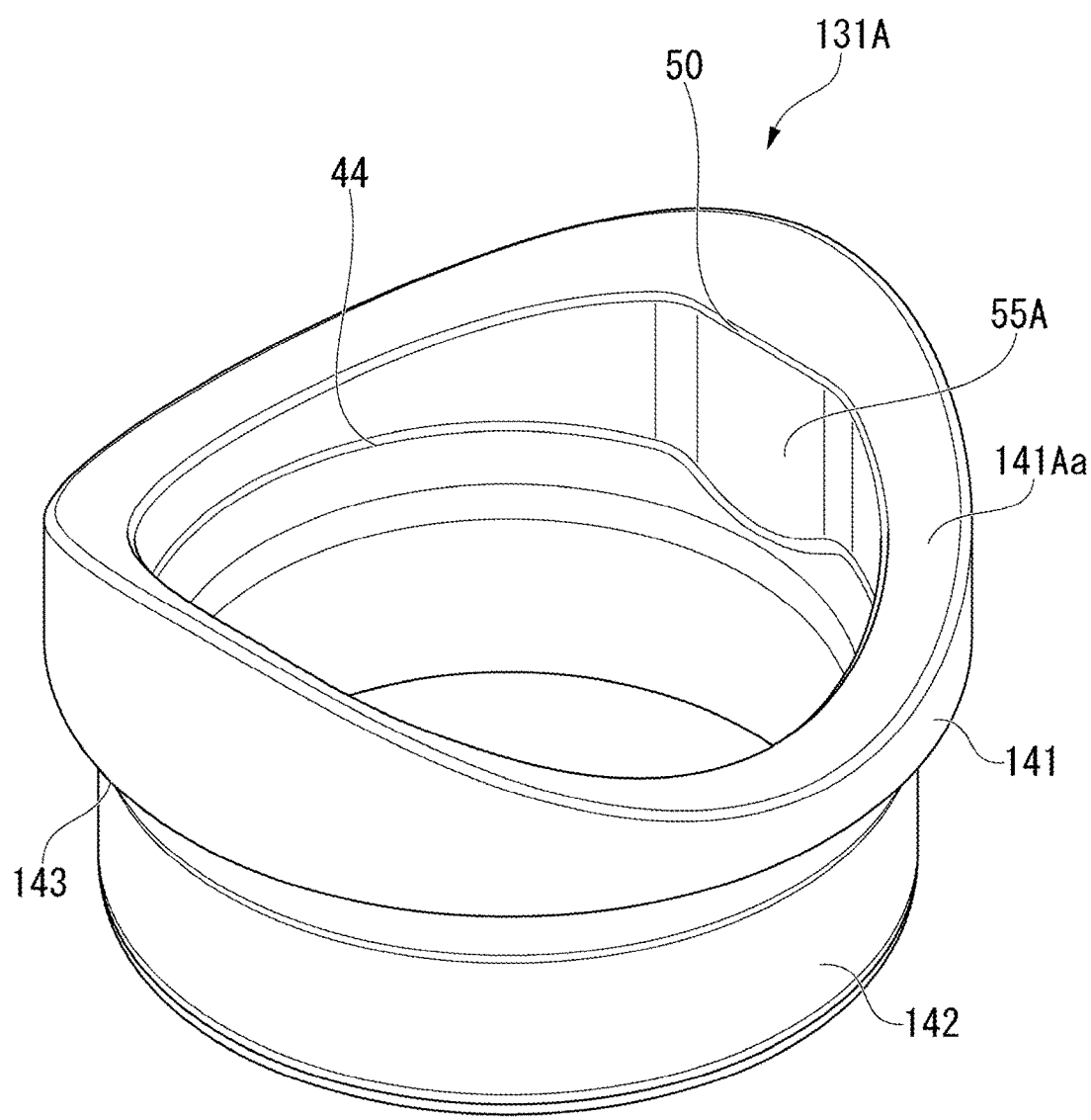
FIG. 10 is a perspective view of the seal cylindrical member according to another embodiment.
Figure 11:
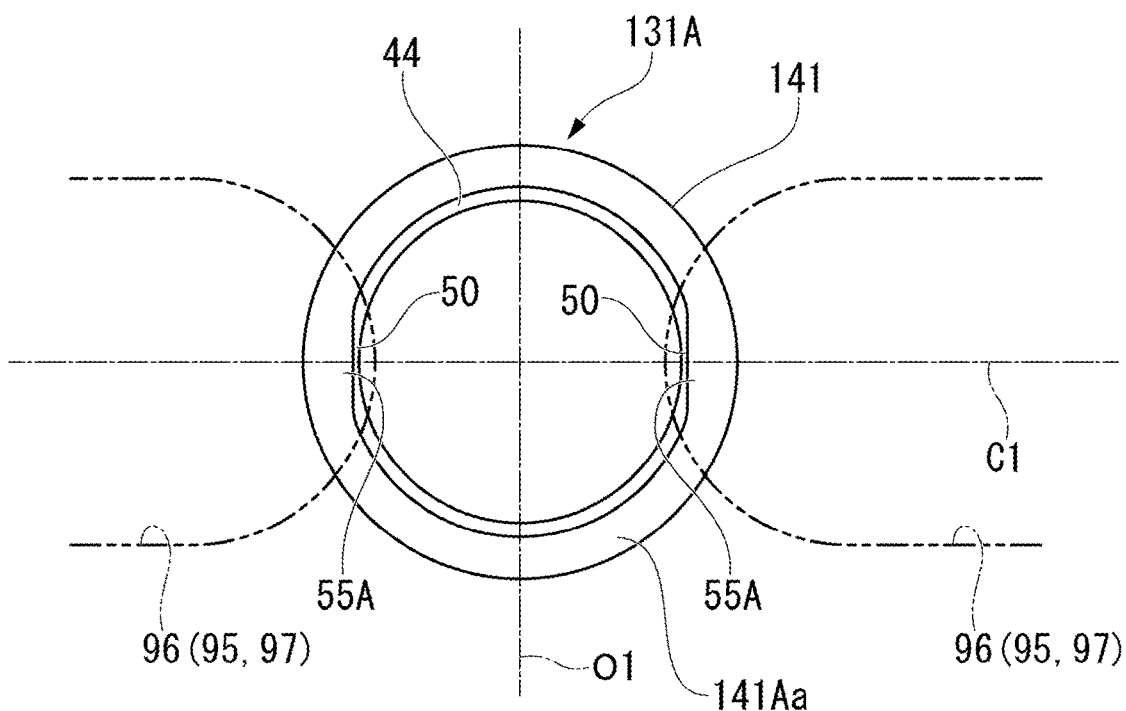
FIG. 11 is an end surface view of the seal cylindrical member according to another embodiment.

FIG. 9 is an enlarged view corresponding to FIG. 5 of the above-described embodiment when a seal cylindrical member 131A of anther embodiment is used. FIG. 10 is a perspective view of the seal cylindrical member 131A when viewed with a valve sliding contact surface 141Aa side up, and FIG. 11 is an end surface view of the seal cylindrical member 131A when viewed from the valve sliding contact surface 141Aa side. Further, in FIG. 11, a valve hole 96 (95, 97) at the start of the valve opening (communication) and at the end of the valve opening (communication) is illustrated by a virtual line.

As in the above-described embodiment, the seal cylindrical member 131A includes a first cylindrical portion 142 and a second cylindrical portion 141 having a larger inner diameter and outer diameter than the first cylindrical portion 142, and the valve sliding contact surface 141Aa which is slidably in contact with an outer circumferential surface of a circumferential wall portion 82 of a valve body 22 is provided at an end portion in the axial direction (the other end portion in the axial direction) of the second cylindrical portion 141. In a circumferential wall of the axial end portion (inner side in a port axial direction) of the second cylindrical portion 141, a protrusion height in a direction toward the circumferential wall portion 82 changes continuously in the circumferential direction along a shape of the outer circumferential surface of the circumferential wall portion 82 of the valve body 22.

As in the above-described embodiment, in the seal cylindrical member 131A of the present embodiment, a thick portion 55A bulging radially inward from an inner circumferential portion of the second cylindrical portion 141 is provided in two regions of the circumferential wall of the second cylindrical portion 141 at which the protrusion height in a direction of the valve body 22 is high (two regions including a portion at which the protrusion height in the direction of the valve body 22 is maximum). However, each of the thick portions 55A extends from a portion of a stepped surface 44 between the first cylindrical portion 142 and the second cylindrical portion 141 to an end surface of the second cylindrical portion 141 on the valve body 22 side (end surface of the other end portion of the seal cylindrical member 131 in the axial direction). In the present embodiment, an end surface in the axial direction of each thick portion 55A constitutes a portion of the valve sliding contact surface 141Aa.

Also, in the case of the present embodiment, as illustrated in FIG. 11, the thick portions 55A disposed at two positions on the circumferential wall of the second cylindrical portion 141 are formed to be parallel to each other when the seal cylindrical member 131A is viewed from the axial direction (port axial direction). A pair of linear inner edge portions 50 extending parallel to an axis O1 (rotation axis of the valve body 22) are formed at two positions in the circumferential direction of the valve sliding contact surface 141Aa by the thick portions 55A. The pair of linear inner edge portions 50 are responsible for the start of the valve opening (start of communication between the valve hole 96 (95, 97) and the seal cylindrical member 131A) and the end of the valve opening (end of communication between the valve hole 96 (95, 97) and the seal cylindrical member 131A) when the valve hole 96 (95, 97) of the valve body 22 is rotationally displaced. At this time, the linear inner edge portion 50 opens and closes the valve hole 96 (95, 97) in a posture perpendicular to a rotational direction of the valve body 22.

A control valve 8A of the present embodiment has the same configuration as that in the above-described embodiment except that the thick portions 55A of the seal cylindrical member 131A extend to the valve sliding contact surface 141Aa to form the pair of linear inner edge portions 50. Therefore, the control valve 8A of the present embodiment can obtain substantially the same basic effects as those of the above-described embodiment.

However, the control valve 8A of the present embodiment can obtain a unique effect in that the fixed communication start position and communication end position of the valve hole 96 (95, 97) can be maintained due to the linear inner edge portions 50. That is, in the present embodiment, since the thick portions 55A of the seal cylindrical member 131A extend to the valve sliding contact surface 141Aa and form the pair of linear inner edge portions 50 extending parallel to the axis O1 of the valve body 22, the valve hole 96 (95, 97) and the seal cylindrical member 131A can communicate and can be caused not to communicate at constant rotational positions of the valve body 22 at all times. Therefore, when the control valve 8A of the present embodiment is employed, outflow characteristics of cooling water can be made further stable.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

What is claimed is:

1. A control valve for switching a flow path of cooling water for a vehicle, comprising:
    a casing including an inlet into which a liquid flows from the outside and an outlet through which the liquid that has flowed into the inside is caused to flow out to the outside;
    a valve body rotatably disposed inside the casing and including a circumferential wall portion in which a valve hole that allows the inside and outside to communicate is formed; and
    a seal cylindrical member including a first end portion in an axial direction of the seal cylindrical member which communicates with a downstream side of the outlet and a second end portion in the axial direction in which a valve sliding contact surface which is slidably in contact with an outer circumferential surface of the circumferential wall portion is provided at a position in which at least a portion in a rotation path of the valve hole of the valve body is overlapped, wherein,
    a height of an edge of the second end portion in a direction toward the circumferential wall portion from the first end portion continuously changes in a circumferential direction along a shape of the outer circumferential surface of the circumferential wall portion,
    the second end portion in the axial direction of the seal cylindrical member includes a thick portion which is thicker compared to other portions of the second end portion and is provided in a region of the second end portion in the axial direction of the seal cylindrical member in which the height is high higher compared to other portions, the seal cylindrical member includes:
- a first cylindrical portion positioned on the first end side in the axial direction and configured to communicate with a downstream side of the outlet; and
- a second cylindrical portion positioned on the second end side in the axial direction and having the valve sliding contact surface formed at an end portion in the axial direction, an inner diameter and an outer diameter of the first cylindrical portion are formed to be smaller than an inner diameter and an outer diameter of the second cylindrical portion, respectively, the thick portion is provided to bulge radially inward on a radial inner side of the second cylindrical portion, and the thick portion extends in an axial direction of the seal cylindrical member and from a portion of a stepped surface formed between the first cylindrical portion and the second cylindrical portion.

2. The control valve according to claim 1, wherein
the thick portion is provided in a region which does not reach an end surface of the other second end portion in the axial direction of the seal cylindrical member, and
the valve sliding contact surface is formed to have a substantially constant radial width throughout in the circumferential direction of the seal cylindrical member.

3. The control valve according to claim 1, wherein
the thick portion extends to an end surface of the second end portion of the seal cylindrical member to constitute a portion of the valve sliding contact surface, and
a linear inner edge portion extending parallel to a rotation axis of the valve body is formed by the thick portion at two positions on the valve sliding contact surface facing each other in the circumferential direction of the seal cylindrical member.

* * * * *